United States Patent [19]

Lopez Luz

[11] Patent Number: 4,791,475
[45] Date of Patent: Dec. 13, 1988

[54] DIGITAL ANALYZER SYSTEM OF THE SYNCHRONIZING PARAMETERS OF A COLOR VIDEO SIGNAL

[75] Inventor: Jose F. Lopez Luz, Madrid, Spain
[73] Assignee: Pesa Electronica, S.A., Madrid, Spain
[21] Appl. No.: 849,461
[22] Filed: Apr. 8, 1986

[30] Foreign Application Priority Data

Aug. 6, 1985 [ES] Spain .................................... 545940

[51] Int. Cl.$^4$ .............................................. H04N 9/62
[52] U.S. Cl. ....................................... 358/10; 358/139
[58] Field of Search ....................... 358/10, 139, 17–19

[56] References Cited

U.S. PATENT DOCUMENTS 4,479,146 10/1984 Cohn ..................................... 358/10

*Primary Examiner*—Michael A. Masinick
*Attorney, Agent, or Firm*—Ladas & Parry

[57] ABSTRACT

A digital analyzer measures the synchronizing parameters of a color video signal, utilizing two microprocessor controlled time measuring blocks, one for relatively long time measurements and one for relatively short time measurements. The horizontal synchronizing signal and burst signal are extracted from the video signal and processed to obtain a vertical synchronizing signal, a field signal, a vertical pulse and equalizing signal, a burst flag signal, a burst position signal and a burst eraser signal. A multiplexer is utilized to select signals to be measured as a "window" signal for a clock signal. The measurement circuit for longer time measurements counts the number of clock pulses during the time "window". Shorter time measurements are made by gating the charging of a capacitor, the output voltage of which is converted to a digital signal by an analog to digital converter. A microprocessor controls the time measurements and displays the results on an LCD display and video monitor.

5 Claims, 6 Drawing Sheets

ND_ANALYZER SYSTEM OF THE
DIGITAL ANALYZER SYSTEM OF THE SYNCHRONIZING PARAMETERS OF A COLOR VIDEO SIGNAL

BACKGROUND OF THE INVENTION

1. Field of the Invention

The present invention relates to a digital analyzer system of the synchronism parameters of a color video signal.

2. Description of the Relevant Art

The present system owes its design to the fact that no apparatus is known which has specially been designed to measure the synchronizing parameters of color video signals. Some of these measurements can be taken with general video instrumentation, such as for example, waveform monitors or vectorscopes, as well as by specific apparatus for taking a single measurement, such as a horizontal-subcarrier phase measuring device (SCM). Some measurements can also be taken with equipments having a high degree of computation, but none of the foregoing equipments expressly take all the measurements of the synchronizing parameters of a color video signal.

SUMMARY OF THE INVENTION

The object of the invention is to automatically measure and control the synchronizing parameters of a color video signal, for simultaneous television systems, that is for PAL and NTSC systems and their derivatives.

Once the system has been connected, it functions automatically, measuring each of the parameters and verifying if the measurement taken is within the range of the standard values. In the event the said parameters are not within the standard values, an alarm is activated which indicates the existence of an abnormality in the measured parameter.

Therefore, the system mainly complies with two functions, viz:

1. Automatically controlling the synchronizing of the video signals.

2. Measuring the said signal and displaying the value obtained on a liquid crystal screen (data representation screen) and on a conventional black and white video monitor.

As already indicated, the system functions automatically, measuring each of the parameters and it is capable of being activated by means of an external switch, so that the operator can measure a complete parameter.

The system of the invention is characterised in that it comprises a microprocessor which controls all the measurements to be taken, which measurements are displayed on the liquid crystal screen.

The microprocessor is assisted by a memory block VRAM which stores all the obtained results, so that the assembly thereof is displayed on a conventional black and white monitor.

The video signal, from which the various parameters must be measured, affects three different blocks; the precision synchronizing extractor, the BURST extractor, and a closed phase locked loop (PLL) block, these three blocks being conventional.

The signals obtained from the precision synchronizing extractor and from the burst extractor are connected to a synchronizing processing block, which produces, by means of a network of logic flip-flops, a plurality of time reference signals for the microprocessor and another plurality of signals for a time measuring block, the plurality of time reference signals for the microprocessor being comprised of the horizontal synchronizing signals (SH), vertical synchronism signals (SV), end-of-field pulse signals (F), BURST eraser signals (BB) and a PAL system identification signal (IP) (only with signals belonging to the PAL system).

The said synchronizing processor also provides a group of "window" signals and a group of clock signals, which are connected to a thick time measuring block.

The thick time measuring block counts the pulses in a given period of time, said time being indicated through the said "window" signal.

On the other hand, the present device is characterised in that it incorporates a thin time measuring block, which is controlled by a measurement selector block, in a manner similar to that made by the synchronizing processor with the thick time measuring block. The measurement selector receives the signal from the precision synchronizing extractor, the signal from the BURST extractor, the signal from the PLL, as well as the signal provided by the precision synchronizing oscillator. Said signals provide the data necessary for controlling the thin time measuring block.

The thin time measuring block takes the measurements on the basis of a time-voltage conversion, to then convert this voltage into a digital signal, which will show the value of the obtained measurement. The period of time measured by the thin time measuring block is relatively short compared with the period of time measured by the thick time measuring block.

BRIEF DESCRIPTION OF THE DRAWINGS

For a better understanding of this specification, a set of drawings is accompanied forming an integral part thereof, wherein illustratively and not limiting the following is represented.

DESCRIPTION OF THE PREFERRED EMBODIMENT

Figure 1:
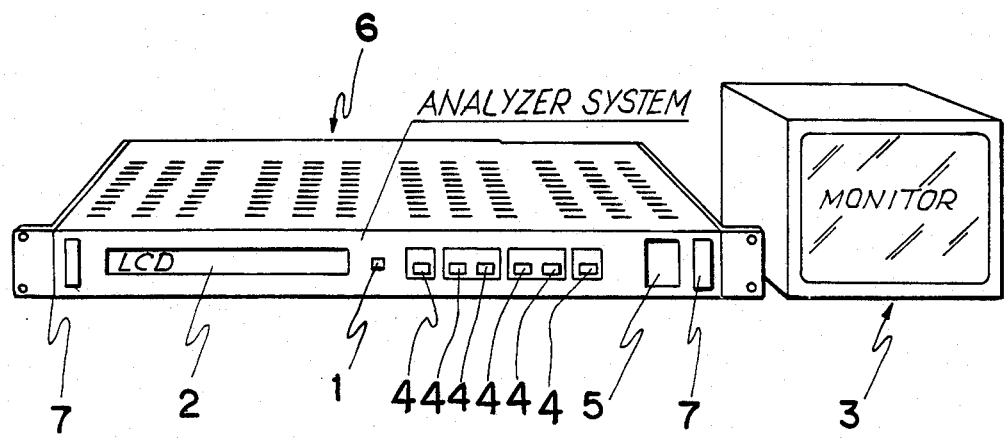
FIG. 1 represents the external view of the apparatus constituting the system, as well as the conventional black and white monitor capable of being coupled to the system.
Figure 2:
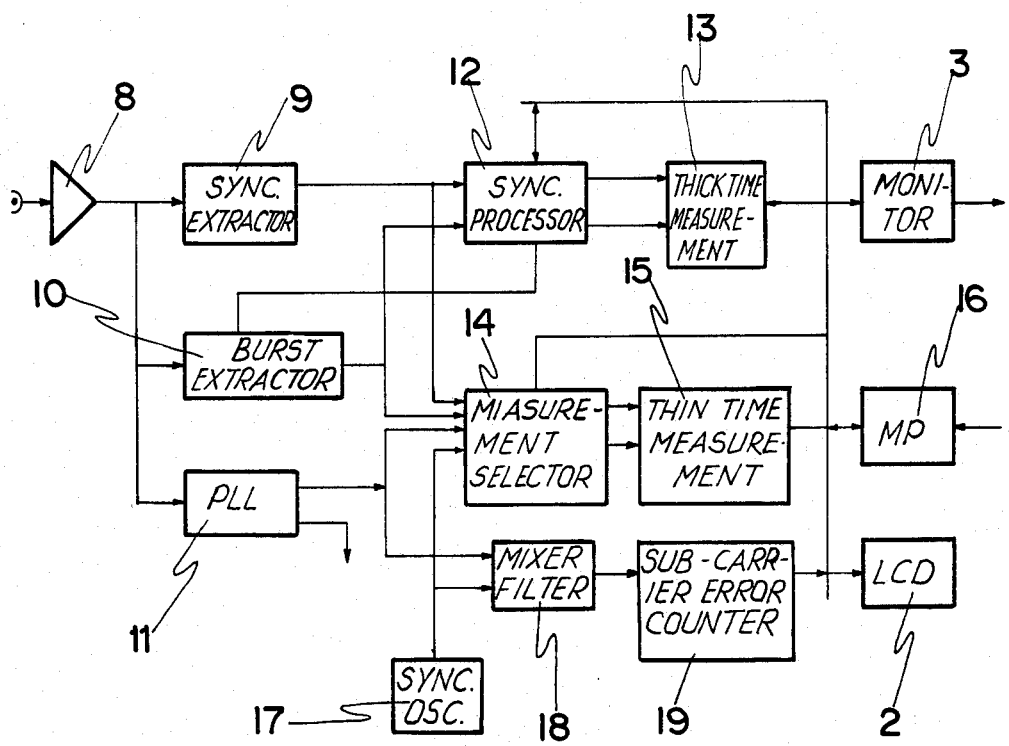
FIG. 2 shows a block diagram of each of the parts constituting the system of the invention.

Once the system has been connected, it will function automatically measuring each of the parameters and verifying if the measurement taken is within the range of standard values. In the event the measurement taken is not within the said values, the system will cause an alarm 1 to be activated which will indicate the existence of an abnormality in the measurement taken.

The results obtained from the measurements taken are locally displayed, one at a time, on the liquid crystal screen 2, and the assembly of all the obtained results on the conventional black and while monitor 3.

In the event the operator is desirous of measuring a complete parameter, he can do so by means of the controls of the front panel 4.

The conventional black and white monitor 3 is connected to the said system by means of the connector 5.

As it can be seen, the complete system is mounted in a housing 6, at the front of which there have been incorporated handles 7.

The composite video signal is amplified by means of a buffer/amplifier which excites the precision synchronizing extractor 9, the BURST extractor 10, and the PLL circuit 11. These three circuits are conventional.

The signal from the precision synchronizing extractor, as well as the signal from the BURST extractor are connected to the synchronizing processor 12 which produces a series of time reference signals for the microprocessor 16 and another series of signals for the thick time measuring block 13.

The time reference signals for the microprocessor 16 are:

A—Horizontal synchronizing (SH)
B—Vertical synchronizing (SV)
C—End-of-field pulse (F)
D—BURST eraser (BB)
E—PAL identifier (IP)

This latter signal only in the event the signal to be measured belongs to the PAL system.

The signals provided by the synchronizing processor 12 to the thick time measuring block 13 are the following:

A—Synchronizing/Synchronizing
B—BURST signalling (BF)
C—BURST positioning (BP)
D—Equalizing (ECS)

The measurement selector circuit 14 receives the signal from the precision synchronizing extracting circuit 9, the signal from the BURST extracting circuit 10, the signal from the PLL circuit 11, as well as the signal from the precision synchronizing oscillator 17. All these signals, processed by the measurement selector 14, provide the necessary signals for the thin time measuring circuit 15.

The microprocessor 16 selects the appropriate "window" and clock signals for the thick time measuring circuit 13, reading the measurement taken by the thick time measuring block 13, when the measurement is complete.

The microprocessor 16 also selects the input signals to the thin time measuring block 15, at the opportune moment, to take the said measurement according to the synchronizing sequence.

Likewise, the microprocessor 16 reads the status of the subcarrier frequency error counter 19, once it has been reset, carrying out this cycle every 10 seconds, to obtain a 0.1 Hz resolution.

The signal from the PLL circuit 11, as well as the signal from the precision synchronizing oscillator 17, are coupled to a mixer and filter 18 which is connected to the subcarrier frequency error counter 19.

As already indicated, the synchronizing processing circuit 12 receives at its inputs the video synchronizing signal and the digital BURST signal, from which a series of signals are obtained.

The signal SV is obtained from two bistable flip-flops 20, 21, so that both receive the synchronizing signal; the bistable flip-flop 21 providing the suitable clock signal for triggering the bistable flip-flop 20, to thus obtain at its output the vertical synchronizing signal (SV).

The signal SH is obtained from the bistable flip-flop 22 which receives the synchronizing signal at one of its inputs and the signal $\overline{SH}$ at its output.

The signal $\overline{SH}$ is connected to the input of a bistable flip-flop 23 which has, as the clock signal, the signal SV, therefore obtaining at the output of the said bistable flip-flop 23 the end-of-field pulse signal (F).

Likewise, the signal $\overline{SH}$ is connected to the input of the bistable flip-flop 24, the output of which is connected to the input of the bistable flip-flop 25, so as to obtain at the output thereof the signal BF.

The NAND gates 26, 27 are connected as a R—S type bistable flip-flop, the signal $\overline{SH}$ being connected to the input of the said gate 26, and the digital BURST BD signal to the input of the gate 27, thereby obtaining the BP signal at the output of the assembly formed of both gates.

Further, the signal BD is connected to one of the inputs of the bistable flip-flop 28, thereby obtaining the signal BB at its output.

The signal ECS is obtained from the synchronizing signal, which is coupled to the bistable flip-flops 29 and 30, the negated output of the bistable flip-flop 30 being connected to the input of the clock of bistable flip-flop 29 to obtain the signal ECS. The non-negated output of the bistable flip-flop 20 proportions a clock signal M1.

The purpose of signals SH, SV, F, BB and IP is to inform the microprocessor of the synchronism sequence carried by the analysing signal.

Figure 3:
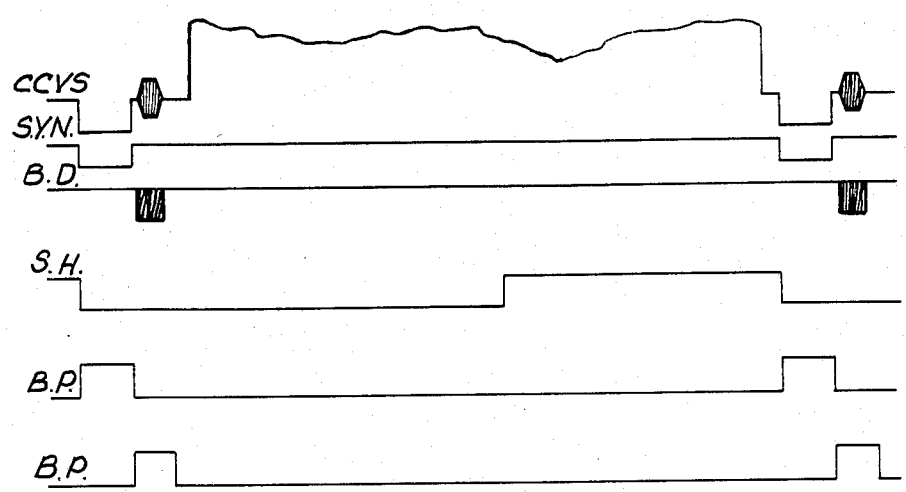
FIGS. 3 and 4 show the reference signals for the microprocessor which will produce, depending upon the said signals, the pertinent control signals.
Figure 4:
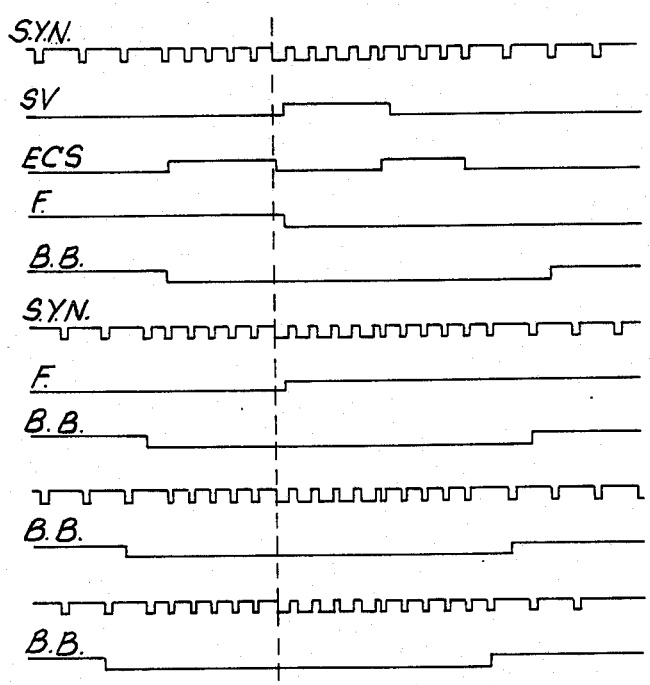
Figure 5:
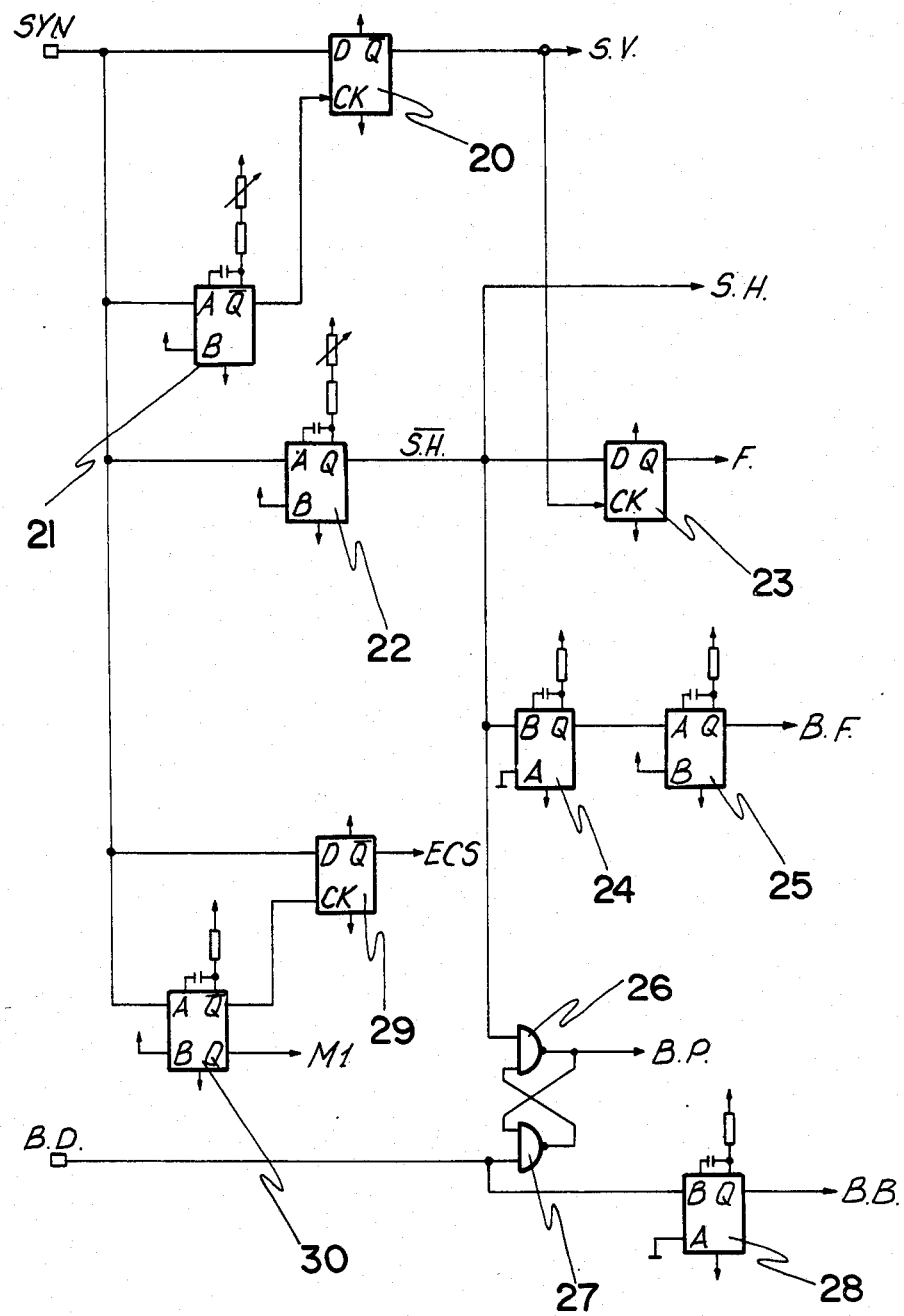
FIG. 5 shows the synchronizing processing circuit.
Figure 6:
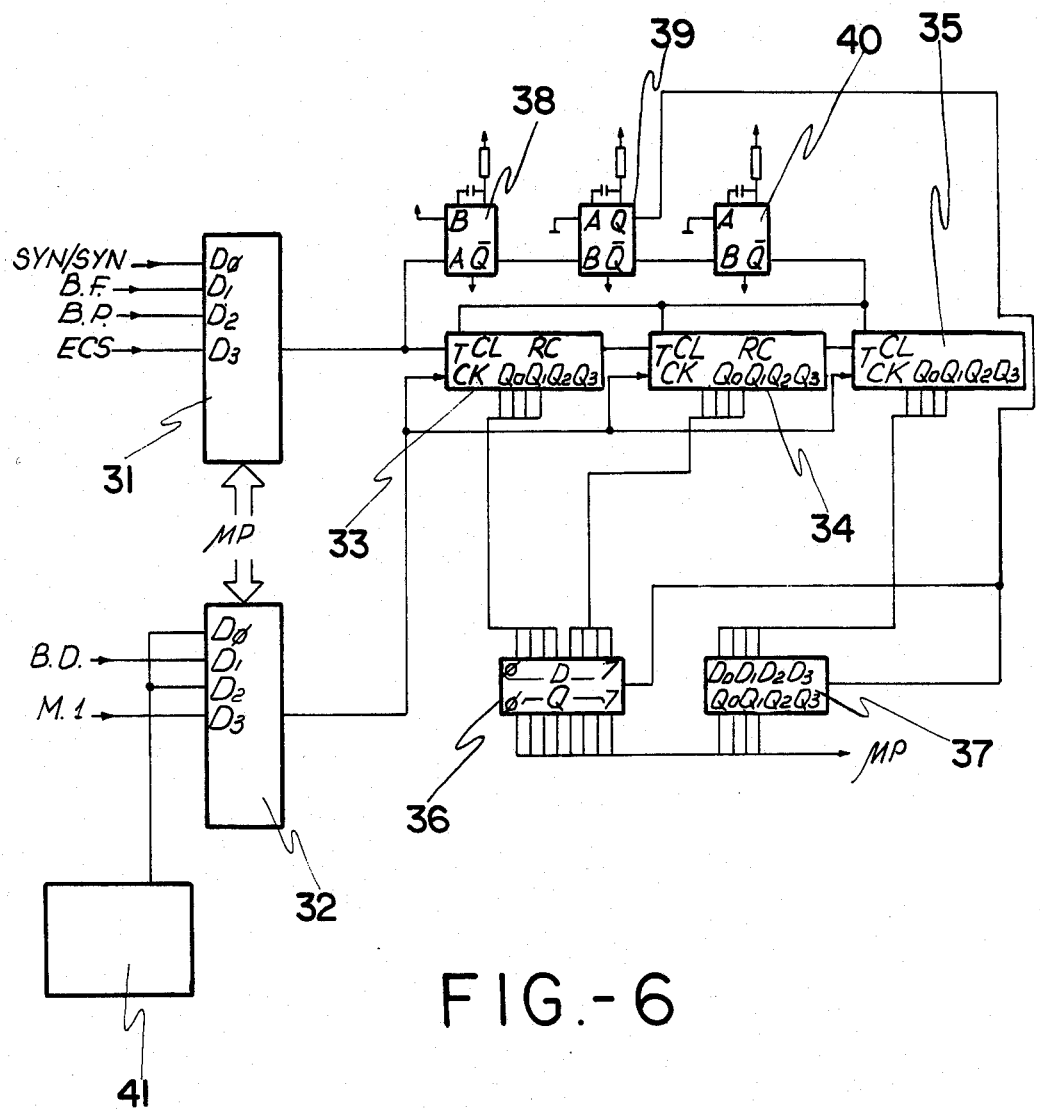
FIG. 6 shows the circuit diagram of the thick time measuring block.

The time diagrams of all the signals produced by the synchronizing processor 12 are shown in FIGS. 3 and 4.

As already indicated, the thick time measuring block 13 receives the signals produced by the synchronizing processor 12. Said signals are divided into two groups: one group of "window" signals and another group of clock signals, the time measuring block acting as a clock pulse counter, while the window is activated.

The group of "window" signals is comprised of the synchronizing signals BF, BP and ECS, whereas the group of clock signals is comprised of 20 MHz oscillator signals, the signal BD and the signal M1.

The group of "window" signals is connected to the input of a multiplexer 31, whereas the group of clock signals is connected to the input of a multiplexer 32. The selection inputs of both multiplexers 31 and 32 are controlled by a microprocessor 16, so that it selects the suitable "window" and clock signals, reading the thick time measuring block at the appropriate moment of the synchronizing sequence.

While one of the "window" signals is activated, the thick time measuring block counts the selected clock pulses by means of the circuits 33, 34 and 35. The result of the counting will always be present at the input of the registers 36 and 37. Once the "window" signal has been deactivated, the counters no longer count, wherefore the data presented at the inputs of the registers 36 and 37 will be fixed and a signal 44 is produced by the bistable flip-flop 39 which allows for passage of the result of the count obtained by registers 36 and 37, the outputs of which are connected to the bus of the microprocessor 16, which is therefore aware of the value of the measurement taken.

Further, the bistable flip-flops 38, 39 and 40 produce a signal 45 which resets counters 33, 34 and 35, enabling a new count to be made as from this moment onwards.

The block 41 is a circuit which oscillates at a frequency of 20 MHz.

Figure 7:
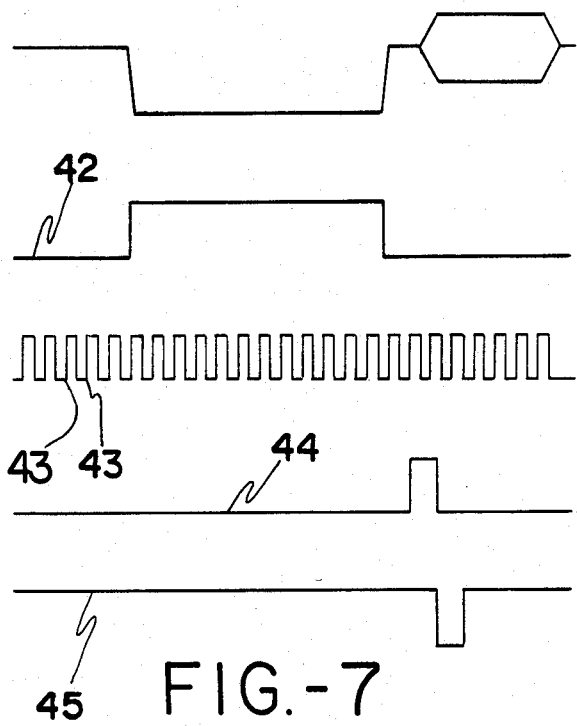
FIG. 7 shows the time diagram of the signals of the thick time measuring block shown in the preceding figure.
Figure 8:
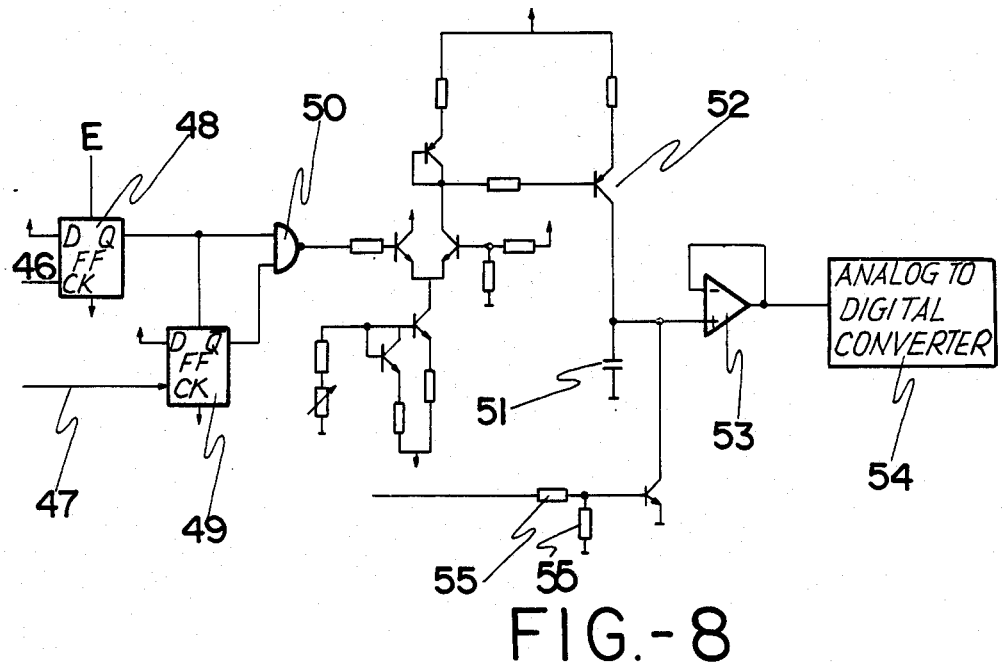
FIG. 8 shows the circuit diagram of the thin time measuring circuit constituting the system of the invention.

The time diagram of the thick time measuring block 13 is represented in FIG. 7. Signal 42 is a generic "window" signal and signal 43 is a generic clock signal. Signals 44 and 45 have already been mentioned.

The thick time measuring block 13 measures the signal SH, upon selection by the microprocessor 16 of the synchronizing signal as the "window" signal and the 20 MHz signal as the clock signal, the microprocessor 16 then reading the thick time measuring block on a determined line of the synchronizing sequence, for which purpose it uses signals F and SH.

Likewise, the thick time measuring block 13 measures the signal ECS in the same manner as previously indicated, but on a different line.

This also occurs with the signal SV for which the suitable line is selected.

The BURST signal is also measured by the thick time measuring block 13, wherefore the microprocessor 16 selects the signals BF as the "window" signal and the signals BD as the clock signals, the microprocessor 16 then reading the result on the suitable line.

The value of the signal BP is obtained by the thick time measuring block 13, wherefore the microprocessor 16 selects as the "window" signal the BP signal produced by the synchronism processor 12, and as the clock signal the 20 MHz signal, the microprocessor 16 then reading the value obtained on the suitable line.

The measurement selector 14, as already indicated, provides two reference signals 46 and 47 for the thin time measuring block 15. The said thin time measuring block 15 measures the period of time elapsed between the falling edge of the start signal 46 and the rising edge of the stop signal 47.

The start signal 46 is connected to the input of the clock of the bistable flip-flop 48, so that when this has been selected by its input E, when a falling edge reaches the said clock input, the output of the bistable 48 will be presented with "1", while the input E of the bistable 49 is activated. As long as the rising edge of the signal 47 does not reach it, the input of the gate 50 will be presented with "1", wherefore the capacitor 51 will charge by conduction of the transistor 52.

The capacitor 51 will continue charging until an ascending side of the stop signal 47 reaches it, since this will cause the gate 50 to present an "0". At this moment the output of the voltage follower 53 will present a voltage value proportional to the time elapsed between both sides, said voltage value being then converted into a digital signal, by means of the analog-digital converter 54, so that the microprocessor 16 is aware of the time elapsed between both sides. Once the measurement has been taken, the capacitor 51 is discharged by the resistor 55, so that a new measurement could be taken.

Therefore, the thin time measuring block 15 could measure the subcarrier phases (SCH), the microprocessor 16 selecting as the start signal the synchronizing signal and as the stop signal the subcarrier from the PLL circuit (this circuit has a continuous wave phase-linked to the BURST reference of the signal being analysed). Once the said signals have been selected by the microprocessor 16, it selects the line on which the measurement should be taken, using as reference signals the signals F, SH and BB (this latter only in the event the measurement is being taken on a PAL system), as well as the controls of the thin time measuring block 15.

Signal 55 represents the time elapsed between the two sides. Signal 56 represents the output of the voltage follower 53.

To measure a possible error of the subcarrier, the microprocessor 16 reads every 10 seconds the associated counter into which the difference in the subcarrier and in the PLL with respect to the master subcarrier enters as a clock signal. It then resets it to proceed with a new reading.

Figure 9:
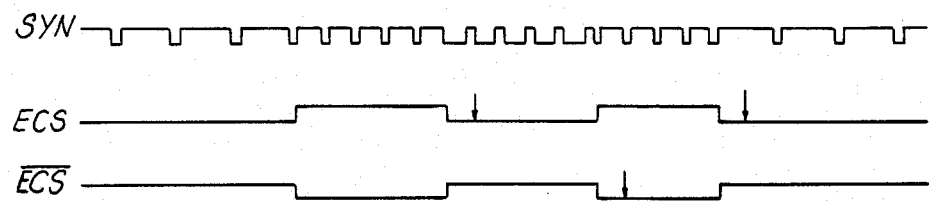
FIG. 9 shows the reading time diagram in the vertical period.
Figure 10:
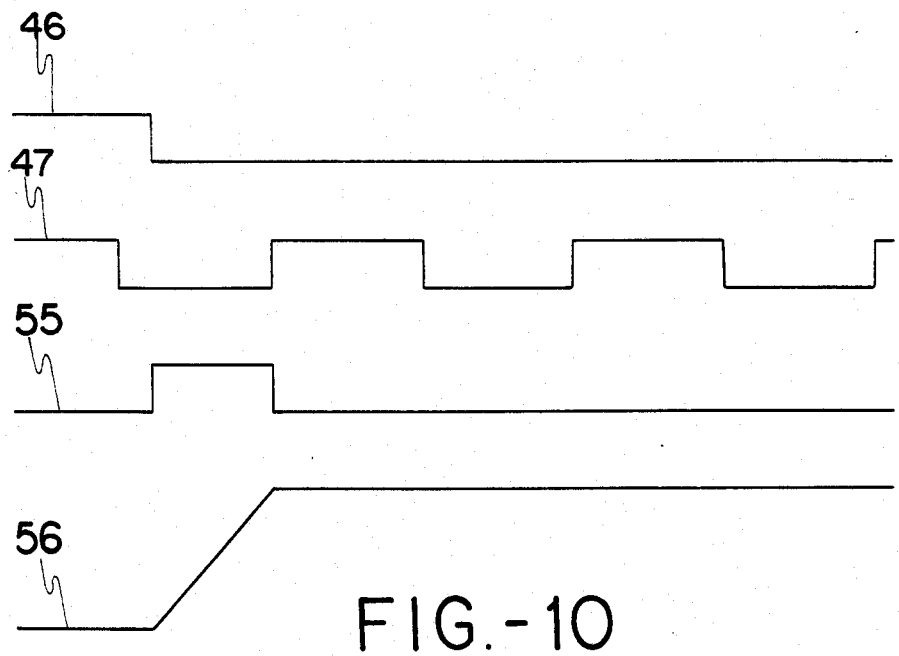
FIG. 10 shows the time diagram of the thin time measuring block.

Further, the thick time measuring block measures the vertical period of time, using the signals ECS/$\overline{ECS}$ as "window" signal and M1 signals as clock signals, reading the number of pre-equalizers, vertical pulses and post-equalizers, according to the time diagram represented in FIG. 9.

The microprocessor 16 measures the end-of-field pulse (F), taking as a reference the rising edge of the signal F, an internal counter being triggered which will again be read by the microprocessor when a new side of the signal F reaches it.

The number of lines is measured by the microprocessor 16, taking as a reference the rising edge of the signal F, the microprocessor counting the high pulses of the signal SH until a new side of the signal F reaches it.

I claim:

1. A system for digitally analyzing a color video signal comprising:
    (a) means for extracting horizontal synchronizing signals from said video signal;
    (b) means for extracting a burst signal from said video signal;
    (c) means for processing said synchronizing signal and said burst signal to generate a plurality of output signals comprising a vertical synchronizing signal, an end-of-field pulse signal (F), a vertical blanking pulse, an equalizing signal (ESC), a burst flag signal, a burst position signal and a burst blanking signal (BB);
    (d) time measuring means controlled by microprocessor means;
    (e) multiplexing means coupled to said processing means and controlled by said microprocessor means for selecting one of said output signals or said synchronizing signal as an input signal to said time measuring means;
    whereby said microprocessor means selects said output signals in sequence for measurement of values of said output signals by said time measuring means; and
    (f) display means coupled to said microprocessor means for displaying said measured values.

2. The system according to claim 1 wherein said time measuring means comprises a counter circuit for counting a clock signal, said counter circuit being controlled by the output signal selected by said multiplying means to generate a count indicative of a parameter to be analyzed.

3. The system according to claim 2 wherein said time measuring means comprises means controlled by a start signal and a stop signal for charging a capacitor during the time between leading edges of said start and stop signals, analog-to-digital converter means coupled to said capacitor for generating a digital signal related to the time between said start and said stop signals.

4. The system according to claim 3 wherein said processing means comprises a network of logic flip-flops for generating said vertical synchronizing signal, said end-of-field pulse signal and said burst blanking signal from said horizontal synchronizing and burst signals.

5. The system according to claim 4 further comprising a phase-locked loop coupled to said burst signal for generating a signal phase linked to said burst signal; a subcarrier frequency error counter coupled to said phase-locked loop for generating an error signal and wherein said microprocessor means reads said error signal every 10 seconds for display of said error on said display means.

* * * * *